United States Patent Office 2,865,719
Patented Dec. 23, 1958

2,865,719

METHOD AND COMPOSITION FOR DETECTING PHOSPHORYLATING COMPOUNDS

David N. Kramer, Baltimore, Md., assignor to the United States of America, as represented by the Secretary of the Army No Drawing. Application November 8, 1956
Serial No. 621,183

10 Claims. (Cl. 23—230)

(Granted under Title 35, U. S. Code (1952), sec. 266)

The invention described herein may be manufactured and used by or for the Government of the United States of America for governmental purposes without the payment to me of any royalty thereon.

This invention relates to a color reaction of phosphorylating compounds, particularly isopropyl methylphosphonofluoridate

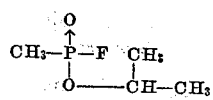

also known as GB, and related compounds, with oximes and to compositions for detecting the presence of such compounds by the use of that reaction.

We have found that phosphorylating compounds yielding acid anions on hydrolysis will react with substituted monoximes of alpha, beta dicarbonyl compounds and that when the reaction is carried out in the presence of Congo red, a red to blue color develops. The reaction is also accompanied by frothing. Other acid-base indicators operative in the pH range 3.5–5 may be substituted for Congo red. In each case the reaction causes a change to the acid color of the indicator.

Example 1

A drop of acid-free isopropyl methylphosphonofluoridate was brought into contact with a butanedione monoxime-Congo red mixture. The color changed from red to blue. Frothing was also observed in the reaction mixture. Congo red in the absence of butanedione monoxime was found to be unaffected by the isopropyl methylphosphonofluoridate.

Example 2

A series of oximes was then screened for reactivity towards isopropyl methylphosphonofluoridate in the following manner. A mixture of 0.1 g. oxime and 0.05 g. Congo red was dispersed in 0.5 g. blanc fixe and the pale red powder was placed in beakers. A drop of acid-free isopropyl methylphosphonofluoridate was then placed on the powder in each beaker. Blanks were run simultaneously in which the oxime was omitted. The reaction was indicated by a red-to-blue color change. It is evidently due to the liberation of HF. At the same time, frothing is observed which is believed to be due to the liberation of nitrogen.

The blank showed no color change and no frothing.

A moderate reaction, indicated by a red-blue color accompanied by frothing was obtained with the following compounds:

Butanedione monoxime 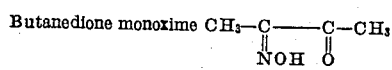

and 2-phenylglyoxal-1-monoxime 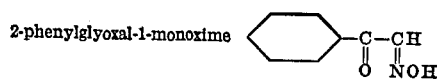

A fast reaction, indicated by a blue color accompanied by frothing, was obtained with 2-methylglyoxal-1-monoxime 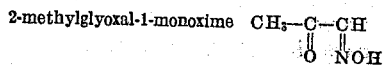

and 1-phenylglyoxal-1-monoxime 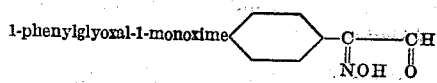

Negative results were obtained with the simple oximes, alpha hydroxy oximes and the dioximes tested. Compounds which gave a negative result were, acetone oxime, acetaldoxime, benzaldoxime, salicylaldoxime, benzoinoxime, and dimethylglyoxime, among others.

The reaction described herein is to be distinguished from that of Fischer, Miller, Sass and Witten in application S. N. 621,184, filed of even date herewith. In the latter case, diisonitrosoacetone (acetone dioxime), is employed as a detector for various compounds, including isopropyl methylphosphonofluoridate, under alkaline conditions. In my procedure, I employ alpha carbonyl monoximes together with an acid-base indicator operative in the pH 3.5–5 range.

In addition to isopropyl methylphosphone-fluoridate, this procedure may be employed to detect other phosphorlyating compounds yielding acid anions on hydrolysis, for example: pinacolyl methylphosphonofluoridate, also known as GD,

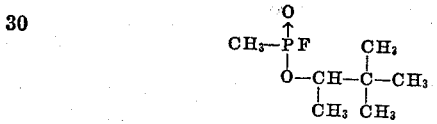

cyclohexyl methylphosphonofluoridate, also known as GF

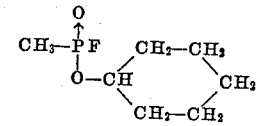

ethyl dimethylphosphoramide cyanidate, also known as GA,

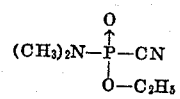

and diisopropylfluorophosphine oxide, also known as DFP

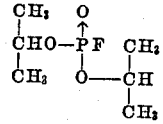

As a test procedure, a mixture of an alpha keto oxime, an acid base indicator and an inert diluent, which may be blanc fixe (barium sulfate) or other material which will not neutralize the liberated acid, e. g. HF, is exposed to liquids or vapors to be tested. A change of the indicator to the "acid" color indicates the presence of the compounds identified above. The mixture may be made up in the form of a chalk.

I believe the mechanism of the reaction to be as follows, using GB as the reactant.

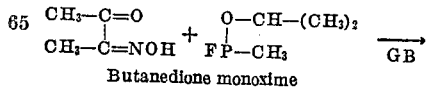

Butanedione monoxime

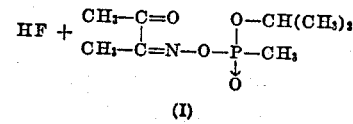

(1)

To explain the observation that frothing occurs simultaneously with liberation of HF in this reaction, it is postulated that the phosphorylated form of the alpha keto oxime (I) decomposes in the presence of the acid to yield gas, e. g., $N_2$ and the hydrolysis products of GB and the alpha keto oxime.

While I have given certain specific examples, it will be obvious that various changes are possible. I therefore wish my invention to be limited solely by the scope of the appended claims.

I claim:

1. A composition of matter for detecting the presence of a phosphorylating compound yielding acid anions on hydrolysis and selected from the group consisting of isopropyl methylphosphonofluoridate, pinacolyl methylphosphonofluoridate, cyclohexyl methylphosphonofluoridate, ethyl dimethylphosphoroamidocyamidate, and diisopropylfluorophosphine oxide comprising a mixture of an alpha carbonyl monoxime, an acid-base indicator showing a change in the pH 3.5–5 range, and an inert diluent, said alpha carbonyl monoxime having the formula

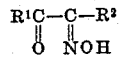

wherein $R^1$ and $R^2$ are selected from the group consisting of methyl, phenyl and hydrogen.

2. A composition as defined in claim 1 wherein said oxime is butanedione monoxime.

3. A composition as defined in claim 1 wherein said oxime is 2-methylglyoxal-1-monoxime.

4. A composition as defined in claim 1 wherein said oxime is 2-phenylglyoxal-1-monoxime.

5. A composition as defined in claim 1 wherein said oxime is 1-phenylglyoxal-1-monoxime.

6. The method detecting a phosphorylating compound yielding acid anions on hydrolysis and selected from the group consisting of isopropyl methylphosphonofluoridate, pinacolyl methylphosphonofluoridate, cyclohexyl methylphosphonofluoridate, ethyl dimethylphosphoroamidocyamidate, and diisopropylfluorophosphine oxide which comprises reacting said compound with an alpha carbonyl monoxime in the presence of an acid-base indicator showing a color change in the pH range 3.5 to 5, said alpha carbonyl monoxime having the formula

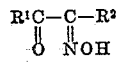

wherein $R^1$ and $R^2$ are selected from the group consisting of methyl, phenyl and hydrogen.

7. A process as defined in claim 5 wherein said oxime is butanedione monoxime.

8. A process as defined in claim 5 wherein said oxime is 2-methylglyoxal-1-monoxime.

9. A process as defined in claim 5 wherein said monoxime is 2-phenylglyoxal-1-monoxime.

10. A process as defined in claim 5 wherein said oxime is 1-phenylglyoxal-1-monoxime.

References Cited in the file of this patent

UNITED STATES PATENTS

| | | |
|---|---|---|
| 691,249 | Dieterich | Jan. 14, 1902 |
| 1,831,894 | Truog | Nov. 17, 1931 |